Jan. 24, 1967  W. J. LINSTROMBERG ETAL  3,299,656
ICE MAKER APPARATUS

Filed June 24, 1965  6 Sheets-Sheet 1

Inventors:-
William J. Linstromberg,
Edwin H. Frohbieter,
By Hofgren, Wegner, Allen,
Stellman & McCord
Attys.

Jan. 24, 1967  W. J. LINSTROMBERG ET AL  3,299,656
ICE MAKER APPARATUS
Filed June 24, 1965  6 Sheets-Sheet 3

United States Patent Office 3,299,656
Patented Jan. 24, 1967

3,299,656
ICE MAKER APPARATUS
William J. Linstromberg and Edwin H. Frohbieter, Evansville, Ind., assignors to Whirlpool Corporation, a corporation of Delaware
Filed June 24, 1965, Ser. No. 466,637
18 Claims. (Cl. 62—233)

This invention relates to refrigeration apparatus and in particular to apparatus for making ice bodies and the like.

In one known form of ice maker, a plurality of ice bodies is formed in a suitable mold having a plurality of upwardly opening cavities formed in a tray by a plurality of partition walls. Water is delivered to the respective cavities by delivery from a supply into one end cavity to flow therefrom successively over the respective mold partition walls until each of the cavities is filled. The water in the cavities is suitably refrigerated to form the desired ice bodies in the mold cavities. Upon completion of the freezing of the ice bodies, they are ejected from the mold cavities by means of a plurality of fingers which are swept downwardly into and through the respective cavities to eject the ice bodies upwardly and outwardly from the cavities to be harvested in a subjacent collecting bin.

In such ice makers, it is desirable to provide an accurate quantity of water to the mold so as to obtain the desired flow seriatim from one cavity to the next and provide ice bodies of a preselected size. It is further desirable to accurately control the size of the ice bridging extending over the partition walls and connecting the respective ice bodies, which bridging must be broken during the ejection cycle to provide the desired discrete ice bodies.

The present invention comprehends an improved ice maker which provides each of the desirable features discussed above in a novel and simple manner.

Thus, a principal feature of the present invention is the provision of an ice maker having new and improved means for accurately controlling the delivery of water to a plurality of mold cavities.

Another feature of the invention is the provision of such an ice maker wherein the water delivery control includes new and improved means for accurately adjusting the quantity of water delivered.

A further feature of the invention is the provision of such an ice maker wherein the means for regulating the delivery of water to the mold includes valve means for controlling water flow thereto and control means for operating the valve means, the control means including switch means having a cam-actuatable operating portion, cam means movably engaging said operating portion for arranging said switch to cause the valve means to be open for a selected period of time, and means for bodily adjustably positioning the control means to adjust the position of the operating portion relative to the cam means for varying the quantity of water delivered to the cavity by adjusting the period of time the valve means is caused to be open.

Still another feature of the invention is the provision of such an ice maker wherein the adjusting means is infinitely adjustable within a preselected range to provide improved accuracy of control of the valve means solenoid.

A yet further feature of the invention is the provision of such an ice maker having new and improved means for adjusting the position of the switch means from outwardly of a housing enclosing the control.

A still further feature of the invention is the provision of such an ice maker including means for releasably retaining the adjustment means in any one of a plurality of adjusted positions.

Yet another feature of the invention is the provision of such an ice maker having new and improved means for initiating a cycle of operation of the control mechanism when desired.

A further feature of the invention is the provision of such an ice maker wherein the cycle initiating means includes a gear forming a portion of the drive means, means rotatably and axially movably carrying the gear, means movable with the gear and provided with first and second cam means, and a switch responsive to the first cam means for energizing the motor upon a preselected rotation of the first cam means from a preselected reset position and responsive to the second cam means for energizing the motor upon a preselected axial movement of the second cam means from a preselected retracted position.

Other features and advantages of the invention will be apparent from the following description taken in connection with the accompanying drawings wherein.

Figure 1:
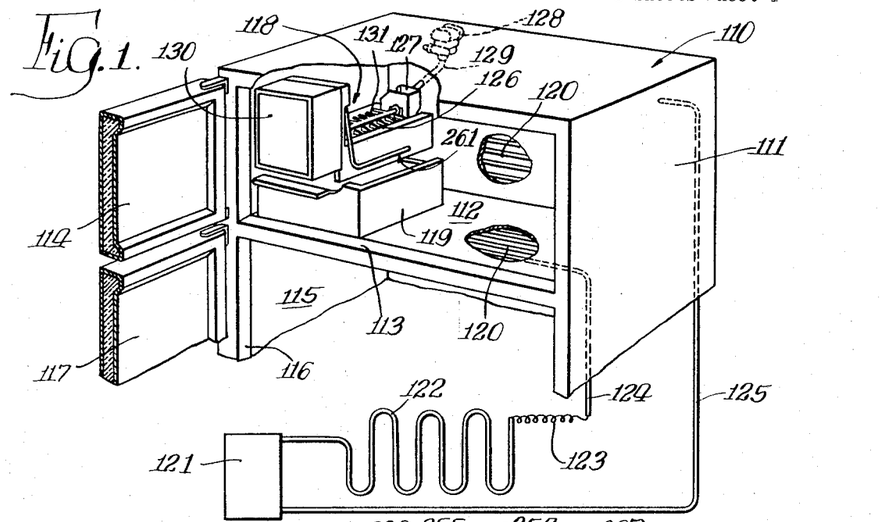
FIGURE 1 is a fragmentary perspective view of a refrigeration apparatus having an ice maker embodying the invention, portions being broken away for facilitating illustration of the apparatus.

In the exemplary embodiment of the invention as disclosed in the drawing, a refrigeration apparatus generally designated 110 is provided with an ice maker 118. As shown in FIGURE 1, ice maker 118 is disposed within a chamber 112 defined by an insulated cabinet 111 having a front opening 113 selectively closed by a door 114. The refrigeration apparatus 110 may further include a subjacent above-freezing chamber 115 having a front opening 116 selectively closed by a door 117. Chambers 112 and 115 are suitably refrigerated as by forced air or refrigerated plate conductive heat transfer means, herein they are refrigerated by a suitable evaporator 120 disposed within the walls of the cabinet 111. The evaporator herein forms a portion of a conventional refrigeration circuit including a compressor 121, a condenser 122, a capillary 123, and conduits 124 and 125 for delivering refrigerant to and from the evaporator 120.

Figure 17:
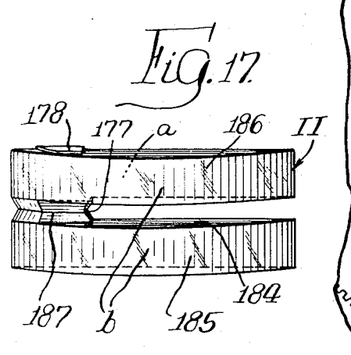
FIGURE 17 is a perspective view of an ice body as formed in the ice maker illustrated in FIGURES 1 through 16.
Figures 18, 19:
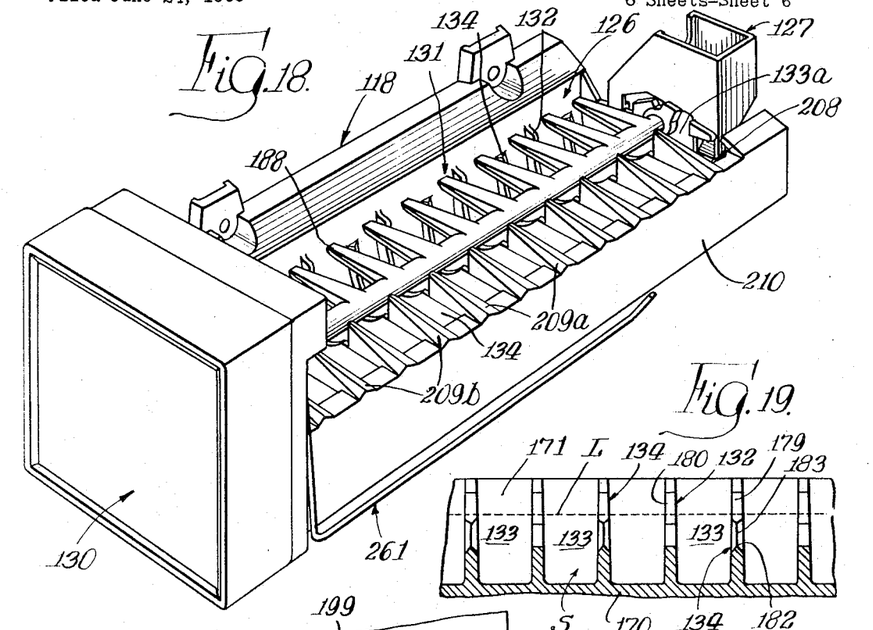
FIGURE 18 is a perspective view of the ice maker.
FIGURE 19 is a fragmentary vertical section taken substantially along the line 19—19 of FIGURE 20.

The ice maker 118, as shown in FIGURE 18, includes a mold 126 in which ice bodies II (FIGURE 17) are formed and from which the ice bodies are ejected to a subjacent collecting bin 119 (FIGURE 1) by means of an ejector 131 which sweeps through the mold during the ejection cycle. The ejector member swings the ice bodies out of the mold and against a stripper member 208 (FIGURE 18) which effectively positively strips the ice bodies from the ejector 131 and causes them to fall downwardly into the collecting bin 119. Cyclical operation of the ejector 131 is automatically effected by a control 130 disposed at the forward end of the mold 126 (FIGURE 18). In addition to cycling the ejector 131, control 130 further automatically provides for refilling of the mold for subsequent further ice body formation therein, in the event that the level of ice bodies in the collecting bin 119 is below a preselected "full" level. Toward this end, control 130 is provided with a sensing arm 261 which periodically senses the level of ice bodies (i.e. during each ejection cycle) and suitably affects the operation of the control 130 to discontinue the ice forming cycling discussed above when the level of ice bodies in collecting bin 119 reaches the preselected level.

Mold 126 defines a plurality of upwardly opening cavities 133 in which the ice bodies II are formed. The water from which the ice bodies are formed is delivered to the mold 126 by means of an inlet 127 connected to a solenoid operated valve 128 by a delivery tube 129. Valve 128 may be connected to a suitable source of water under pressure (not shown).

MOLD MEANS

Figures 4, 5, 6:
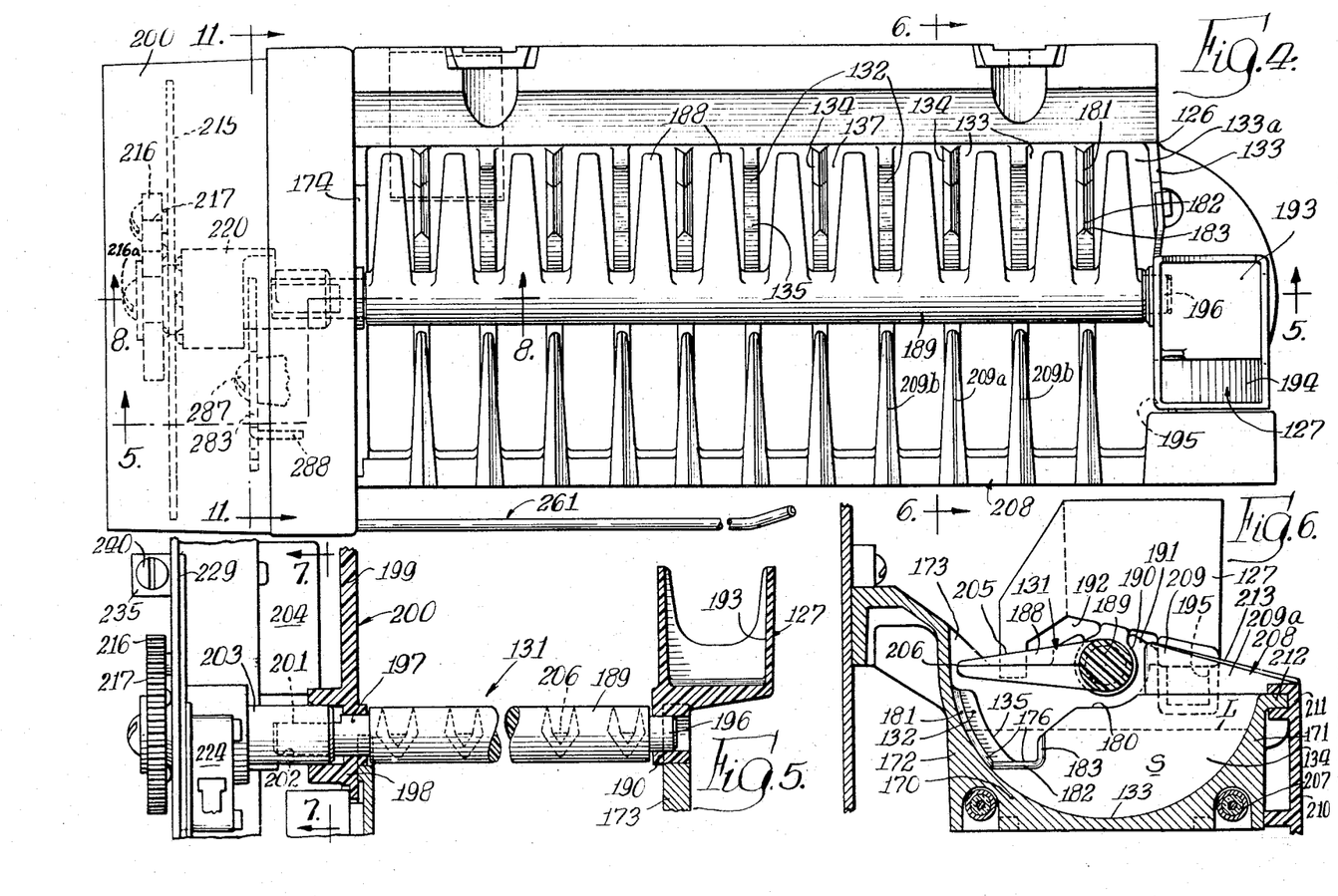
FIGURE 4 is a plan view of the ice maker.
FIGURE 5 is a vertical section taken substantially along the line 5—5 of FIGURE 4.
FIGURE 6 is a transverse vertical section taken substantially along the line 6—6 of FIGURE 4.
Figure 20:
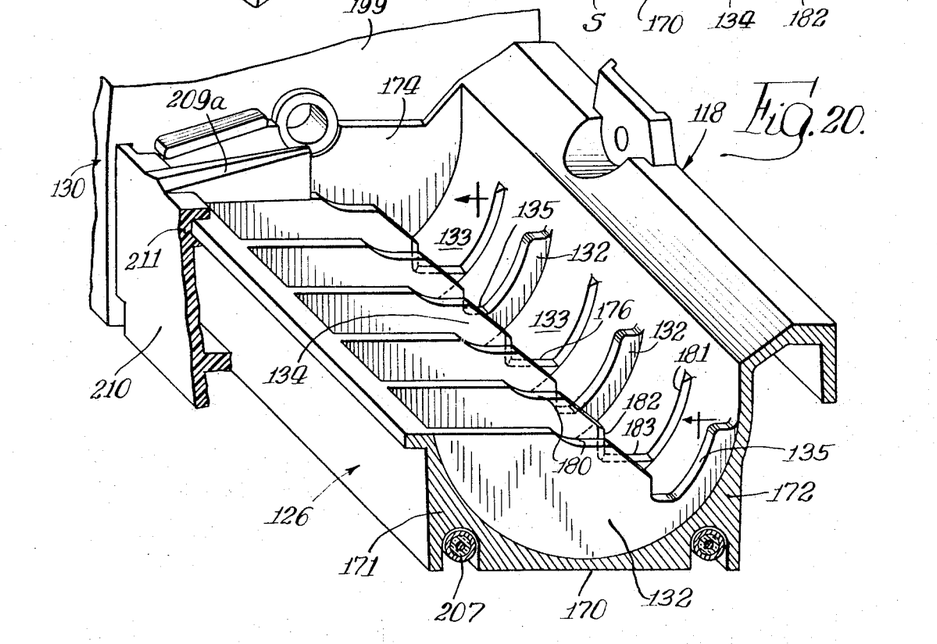
FIGURE 20 is a fragmentary perspective view of the mold of the ice maker, with a portion of the stripper member as mounted thereon.

Referring to FIGURES 4, 6 and 20, mold 126 herein more specifically comprises a tray structure having a bottom wall 170, side walls 171 and 172, rear end wall 173, and a front end wall 174. A plurality of partition walls 132 extend transversely across the mold to define, with the above indicated tray walls, the cavities 133 in which the respective ice bodies II are formed. Herein, each cavity 133 is partially divided by a partial dividing wall 134 which extends transversely across the cavity, as best seen in FIGURES 6 and 20. Each of the partition walls and dividing walls is provided with a recessed upper edge portion through which the water flows from the end cavity 133a successively forwardly to the respective cavities until all cavities are filled to the level L, as shown in FIGURE 6. Thus, the recessed edge portions of the respective partition and dividing walls, over which the water flows, effectively define a plurality of weirs over which a small body, or bridge, of connecting ice forms during the freezing operation. As shown in FIGURE 6, however, the recess 176 in the upper edge of the partial dividing wall 134 is substantially larger than the recess 135 in the partition wall 132 below the level L so that the connecting portion 177 of ice disposed in the recess 176 will be substantialy larger, and less frangible, than the connecting portion 178 of ice in the recess 135. The connecting ice portion 177 of ice body II, as shown in FIGURE 17, is preferably sufficiently strong to prevent breaking thereof during the normal ejection and transfer of the ice body II from the mold cavity 133 to the collecting bin 119. Illustratively, the connecting portions 178 between the respective ice bodies may break as a result of the impact of the ice bodies resulting from their free fall into the collecting bin, the connection portions 177 being sufficiently strong to preclude breakage as from such impact forces.

Figure 8:
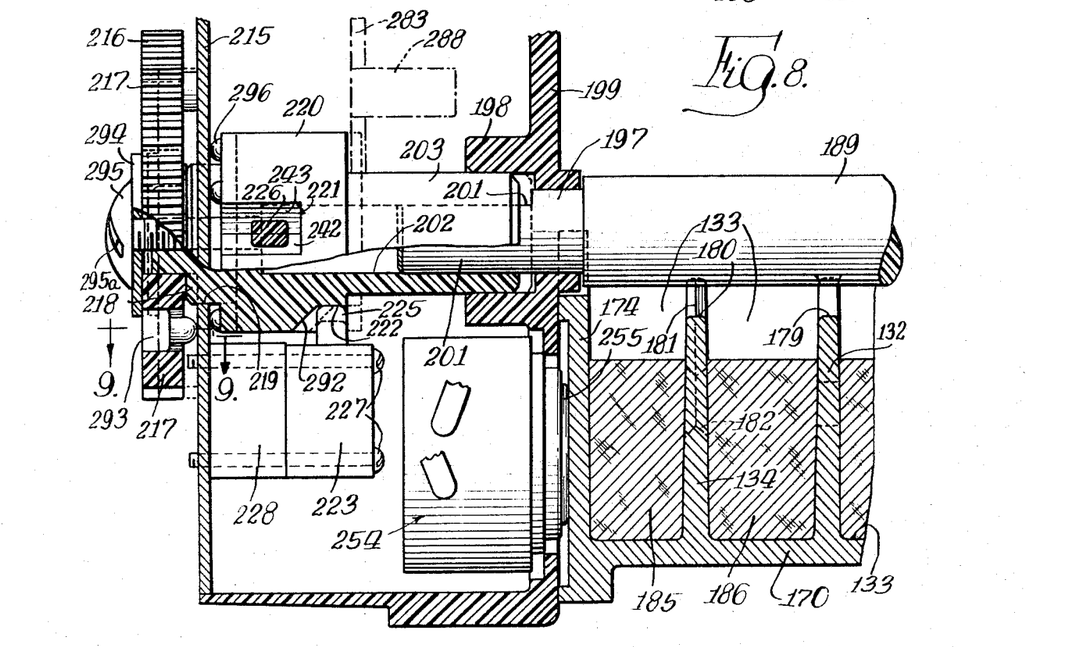
FIGURE 8 is an enlarged vertical section taken substantially along the line 8—8 of FIGURE 4.

As shown in FIGURE 8, the partition walls 132 and partial dividing walls 134 may narrow slightly, upwardly from bottom wall 170. Each partition wall is provided with a substantially flat upper surface 179. The partial dividing wall includes a substantially flat upper surface portion 180 (FIGURE 6), but the portion thereof defining the recess 176 is provided with a chamfered, or wedge-shaped, edge which as best seen in FIGURE 6 includes an outer portion 181, a bottom portion 182, and an inner portion 183. Thus, the partial dividing wall 134 forms a slot 184 in the ice body II (FIGURE 17) effectively dividing the ice body into a pair of spaced major portions 185 and 186 disposed to the opposite sides of the partial dividing wall 134 during the forming of the ice body in cavity 133, and connected by the connecting ice portion 177 to define the complete, bifurcated ice body. The chamfered edge portions 182 and 183 of the recess 176 form a fracture-inducing line 187 in the ice body at the inner edge of the slot 184. Likewise, chamfered edge portion 181 forms an extension of the fracture-inducing line 187 along a portion of the periphery of the ice body II. Thus, while connecting ice portion 177 is relatively strong and prevents separation of the ice body portions 185 and 186 from each other during the ejection and collecting in bin 119, the ice body II may be subsequently readily broken into two portions by simple fracture of the ice body along the line 187.

As shown in FIGURE 6, dividing walls 134 extend inwardly from the lower right-hand boundary of the space S in cavity 133 below the level L toward the upper left-hand boundary of the space defined by the open end of the cavity at level L and the upper portion of the left mold side wall 172 below the level L. The resultant ice body II, therefore, has a transverse periphery (i.e. perpendicular to the longitudinal extent of the mold) which is defined by a flat upper surface $a$ and a segmentally cylindrical lower surface $b$ corresponding to the periphery of the space S as defined by the water level L and the cylindrical surface of the cavity 133 below the level L as shown in FIGURE 6. Each partial dividing wall 134 extends lengthwise parallel to the dividing walls along this periphery of the ice body-forming space over approximately one-half the full periphery of the space while yet providing the desirable connecting portion 177 in the ice body II by virtue of the larger size of dividing wall recess 176 as compared to recess 135 of the partition wall 132. The minimum cross-section of the connecting ice portion 177 as defined substantially by the area outwardly of the fracture-inducing line 187 parallel to the lengthwise extent of the dividing wall 134 is preselected to provide the desirable normal maintaining of the two ice body portions 185 and 186 in attached association until separated by intentional action of the user.

As shown in FIGURE 4, the partial dividing wall 134 herein is disposed substantially at the center of cavity 133 so as to divide the cavity symmetrically into two halves whereby each of the ice body portions 185 and 186 is substantially identical. As further shown in FIGURE 8, each of the partition and partial dividing walls is formed integrally with the bottom wall 170 and the side walls of the mold. The mold is preferably formed of a material having high thermal conductivity and, thus, the partial dividing walls 134 provide an improved fast freezing of the ice body as it projects upwardly into the center of the forming ice bodies to conduct heat readily from this mid-portion of the water delivered to the cavity 133, which normally is the last portion to be frozen. Thus, ice maker 118 provides a substantially increased rate of ice body production providing improved efficiency in the operation of apparatus 110.

THERMOSTAT MEANS

Figures 11, 12, 13, 14:
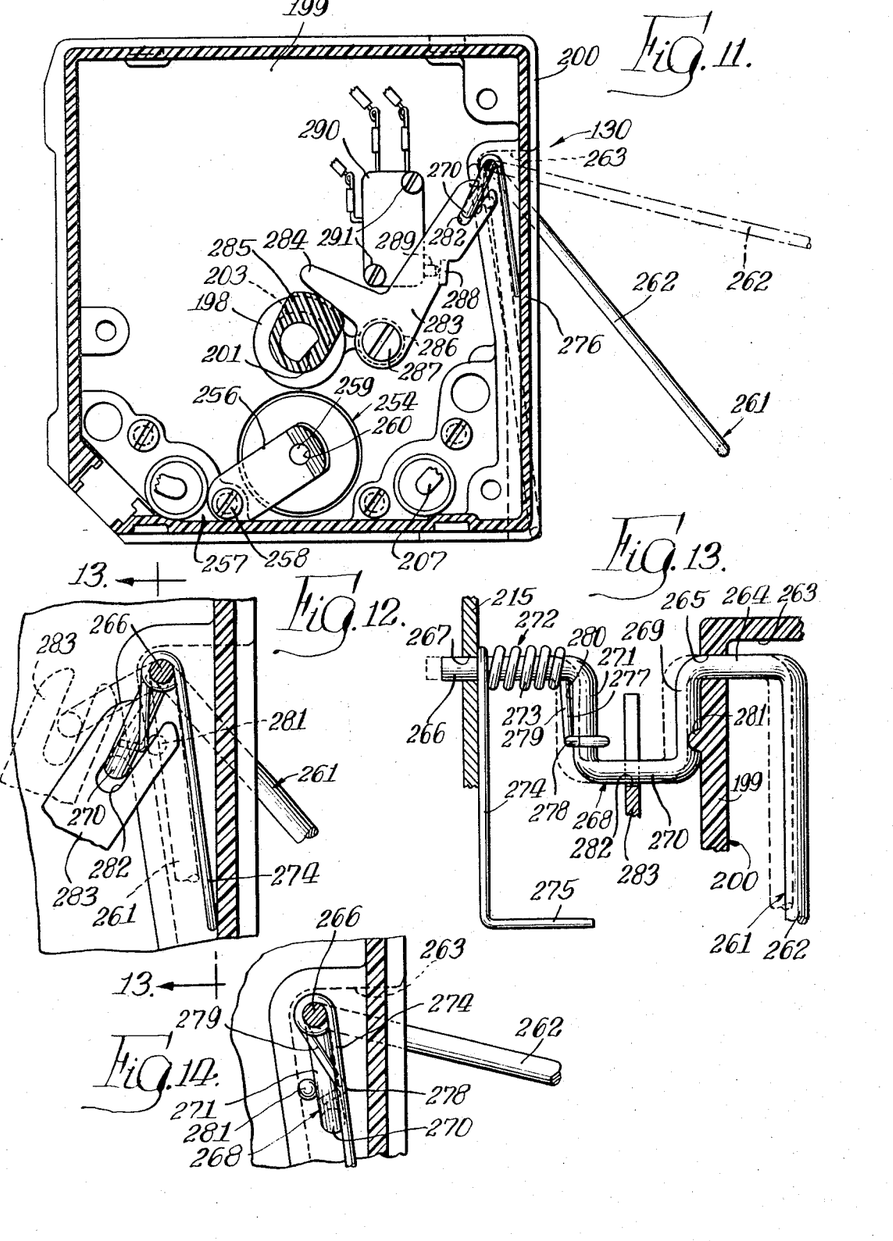
FIGURE 11 is a transverse vertical section taken substantially along the line 11—11 of FIGURE 4.
FIGURE 12 is a fragmentary enlarged vertical section illustrating a portion of the control as shown in FIGURE 11.
FIGURE 13 is a fragmentary vertical section taken substantially along the line 13—13 of FIGURE 12.
FIGURE 14 is a fragmentary transverse section similar to that of FIGURE 12 but with the sensing arm in a shutoff position.

The refrigeration of the water in the mold 126 is herein effected by the cold air within chamber 112; although as will be obvious to those skilled in the art, other suitable means may be employed for refrigerating the mold within the scope of the invention. Control 130, as indicated above, includes a thermostat 254, herein of the bimetallic type, which senses the temperature of the mold 126 to determine the completion of freezing of the ice bodies and as a result thereof automatically initiate the ejection cycle. As best seen in FIGURE 8, the thermostat includes a sensing portion 255 projecting rearwardly through the housing wall 199 into thermal transfer contact with the rear wall 174 of the mold. As shown in FIGURE 11, the termostat may be biased against the mold wall 174 by a flat spring 256 secured to a boss 257 in housing 200 by suitable means such as screw 258. The thermostat may be provided with an axial outwardly projecting boss 259 extending through a suitable opening 260 in the distal end of the spring 256.

Herein, the completion of the ice body formation is indicated when the temperature of the mold is reduced to approximately 23° F. Heretofore, without the provision of a thermally conductive partial dividing wall such as dividing wall 134 herein, the temperature of the mold upon complete freezing of the ice bodies therein has had to be approximately 13° F. or below. By removing heat energy directly from a mid-portion of the cavity 133, the ice bodies are formed with substantially less refrigeration than heretofore required where the refrigerating surfaces of the mold cavities were limited to the peripheral boundaries thereof. As a result of the improved efficiency of refrigeration, thermostat means 254 herein may comprise an inexpensive relatively wide tolerance thermostat thereby substantially reducing the cost of control 130 as compared to the known controls requiring the use of more expensive thermostats having narrower operating tolerances. More specifically, herein thermostat 254 comprises a thermostat having an operational tolerance of plus or minus 5° F. Thus, the thermostat may comprise a thermostat nominally rated to operate at a low temperature of 18° F. As the actual operating temperature of the thermostat may be 23° F. (i.e. 18°+5°=23° where the specific thermostat is one at the upper end of the tolerance range), the ejection cycle as controlled by the thermostat will be initiated at the time the temperature of the mold as sensed by the thermostat is reduced to 23° F. Where the specific thermostat is one which actually operates at the lower end of the tolerance range, i.e. at 13° F. the refrigeration of the mold will be continued beyond the point where the ice bodies are fully formed and until the portion of the mold sensed by the thermostat reaches the 13° F. point. This entire range of operation, however, is above the range of operation of the termostats previously employed which were required to sense a mold temperature at 13° F. or below. As the temperature of the refrigerating means is conventionally approximately 0° F., if a 5° F. tolerance thermostat were to be used where this lower temperature range is required, one would have to select thermostats nominally rated at 8° F. so that at the upper end of the tolerance range 13° F. operation would be obtained and at the lower end of the range the thermostats would operate at only 3° F. The lowering of the mold to approximately 3° F. by refrigerating means which is at approximately 0° F. is substantially impractical because of the small temperature differential and, thus, the use of relatively expensive narrow tolerance thermostats such as thermostats having tolerances of plus or minus 3° F. only have heretofore been the commercial practice. Thus, it has been conventional to employ thermostats nominally rated at 10° F. with a plus or minus 3° F. tolerance so that such thermostats operate in the range of 7° F. to 13° F. to thereby provide the necessary differential above the 0° F. refrigeration temperature to permit satisfactory operation. Such narrow tolerance thermostats, however, are substantially more expensive than the above-described wide tolerance 5° F. temperature differential thermostat employed in the present invention and, thus, control 130 provides a substantial reduction in the cost thereof as compared to the conventional controls requiring such narrow tolerance thermostats.

Thus, ice maker 118 is arranged so that the completion of the freezing of the ice bodies II is caused to occur while the temperature of the mold portion sensed by the thermostat 254 is relatively high, i.e. closer to the water freezing temperature of 32° F. than to the refrigeration temperature herein of 0° F. Herein, this indicative mold temperature is 23° F. The substantial differential between such a relatively high thermostat operating temperature and the relatively low 0° F. refrigeration temperature permits the highly desirable use of the above described low cost thermostat means 254.

To further reduce the cost of the thermostat 254, it is desirable to utilize a relatively high reset temperature. In the illustrated embodiment, the reset temperature of the thermostat 254 is approximately 50° F. and, thus, thermostat 254 may be a relatively low cost thermostat having a differential of over 30° F. between the actuation, 23° F., temperature and the reset, 50° F., temperature thereof.

EJECTOR-STRIPPER MEANS

As indicated briefly above, the ejection of the ice bodies II from the mold cavities 133 is effected herein by an ejector 131 comprising a plurality of fingers 188 carried by a shaft 189. As best seen in FIGURES 5 and 6, the inlet 127 comprises a plastic cup member provided with a depending annular bearing 190 secured to wall 173 by a pair of bosses 191 and 192 upstanding from the rear end of the mold. Inlet 127 as seen in FIGURE 4 defines a well 193 for receiving water from the conduit 129 (FIGURE 1) and a chute 194 for conducting the water from the well 193 through an opening 195 into the rear cavity 133a of the mold.

Referring to FIGURE 5, the rear end 191 of the ejector shaft 189 is journalled in the bearing 190. The forward end 197 of the shaft 189 is journalled in a bearing portion 198 of the rear wall 199 of a housing 200 of control 130 and is provided with a flatted connecting portion 201 received in a corresponding recess 202 of a shaft 203 which as will be explained more fully hereinafter is driven by a motor 204 of the control 130. As seen in FIGURE 5, each finger 188 is provided with a flat, ice body-engaging, ejector surface 205 and tapers from a substantially pentagonal cross-section adjacent shaft 189 to a substantially triangular cross-section at on outer tip 206. The ejector 131 may be formed of a suitable plastic material (e.g. acetyl resin, nylon, etc.) having sufficient strength to apply the necessary ejection forces to the ice bodies II in the cavities 133.

The motor 204 rotates ejector 131 about the axis of the shaft 189 in a clockwise direction as seen in FIGURE 6, whereby the surfaces 205 of the pair of fingers 188 aligned with each cavity 133 bear against the upper surface of the ice body at level L and carry it in an arc about the axis of the shaft 189 to above the cavity 133 and to laterally beyond the wall 171 of the mold to fall into the subjacent collecting bin 119, as shown in FIGURE 1. A sheathed resistance heater 207 is disposed in the mold wall 170 for delivering heat to the mold so as to melt the surface of the ice body confronting the mold wall and thereby facilitate the freeing of the ice body from the mold when the ejector fingers 188 are brought thereagainst.

To strip the ice body positively from the ejector fingers 188 when the ice body reaches a position overlying right-hand wall 171, a stripper member 208 is mounted on the mold having a plurality of fingers 209a and 209b which overlie respectively the partial dividing walls 134 and the partition walls 132. As best seen in FIGURE 6, the stripper member 208 includes an apron 210 having a recessed connecting portion 211 carried on an outturned flange 212 at the upper end of the mold side wall 171. The stripper member herein comprises a molded member having the fingers formed integrally with the apron 210. The fingers 209a and 209b are arranged to rest on the upper edges of the dividing and partition walls. The flatwise extent of the fingers 209a and 209b is perpendicular to the spacing between the fingers, or parallel to the flatwise extent of the dividing and partition walls and, thus, the fingers effectively define upper wall extensions of the dividing and partition walls. As best seen in FIGURE 4, the fingers narrow toward their distal ends so that the spacing between adjoining portions of the fingers overlying mold side wall 171 is less than the spacing between the distal ends of the fingers adjacent ejector shaft 189.

The fingers 209a effectively define stripper fingers which are disposed in overlying relationship to the space S (and cavity 133) mid-way between the front and rear ends of the cavity defined by the partition walls 132. Thus, the stripper finger 209a effectively positively blocks re-entry of the ejected ice body back into the cavity 133 as it is swung about the axis of the shaft 189 by the ejector fingers 188. As best seen in FIGURE 6, the upper surface 213 of each finger 209a and 209b is inclined downwardly toward apron 210 so as to guide the stripped ice body downwardly around the right side wall 171 and into the subjacent collecting bin 119.

Fingers 209b are substantially similar to fingers 209a but are arranged to overlie the partition walls 132 defining the ends of the cavities 133. Thus, fingers 209b effectively comprise guide fingers which effectively preclude cocking of the ice bodies as they are stripped from the ejector between stripper fingers 209b and, thus, cooperate with the stripper fingers 209a in effectively blocking re-entry of the ejected ice bodies into the cavities 133. The spacing between the guide fingers 209b is slightly less than the width of the ice bodies (the fore and aft dimension thereof perpendicular to the planes of the partition walls 132) and, thus, each of the opposite ends of the ice body engage the corresponding guide fingers during the stripping operation to be guided thereby as discussed above. The inclined upper surfaces 213 of the guide fingers similarly direct the stripped ice bodies over the side wall 171 and apron 210 to fall into the collecting bin, whereby the impact forces resulting from this free fall of the ice bodies effectively break the frangible connections 178 between the respective ice bodies II, thereby completing the formation of the plurality of ice bodies II.

The stripper member 208, comprising the stripper fingers 209a, the guide fingers 209b, and the apron 210, is preferably a one-piece molding formed of an insulating plastic so as to minimize melting of the ice bodies II when in engagement therewith. The insulating fingers 209a and 209b preclude engagement of the ice bodies with the metal mold walls and the insulating apron 210 precludes engagement thereof with the exterior of side wall 171 during transfer of the ice bodies to the collecting bin.

MOTOR-DRIVE MEANS

Figures 7, 9, 10:
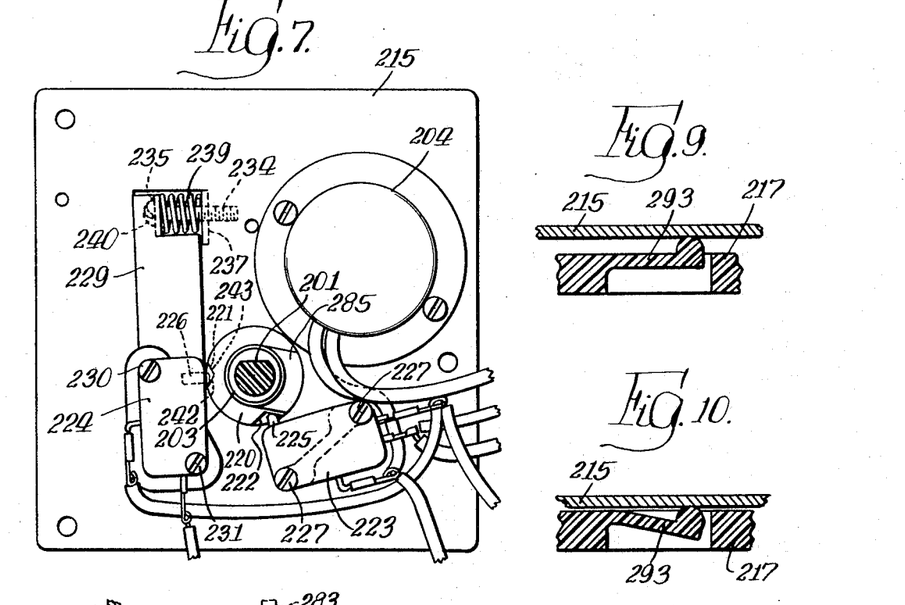
FIGURE 7 is a vertical section of the control taken substantially along the line 7—7 of FIGURE 5.
FIGURE 9 is a fragmentary horizontal section taken substantially along the line 9—9 of FIGURE 8.
FIGURE 10 is a fragmentary horizontal section similar to that of FIGURE 9 but with the gear in an axially rearwardly displaced position.

The control 130, as indicated above, includes a motor 204 which provides the necessary ejection force to the ejector 131. The motor 204 is provided with an output shaft 214 shown in FIGURE 3 extending forwardly from the motor through a front mounting plate 215 in housing 200 and carrying forwardly of the plate 215 a drive gear 216 meshing with a larger gear 217 carried on the forward end 218 of the shaft 203 driving the ejector 131. Shaft end 218 is journalled in an opening 219 in plate 215 and includes a forward cam portion 220 immediately rearwardly of the plate 215 (see FIGURE 8). As best seen in FIGURE 7, cam portion 220 is provided with a pair of camming recesses 221 and 222 which are spaced apart approximately 90 degrees to control operation of a pair of snap acting switches 223 and 224 having plungers 225 and 226, respectively.

Figures 2, 3:
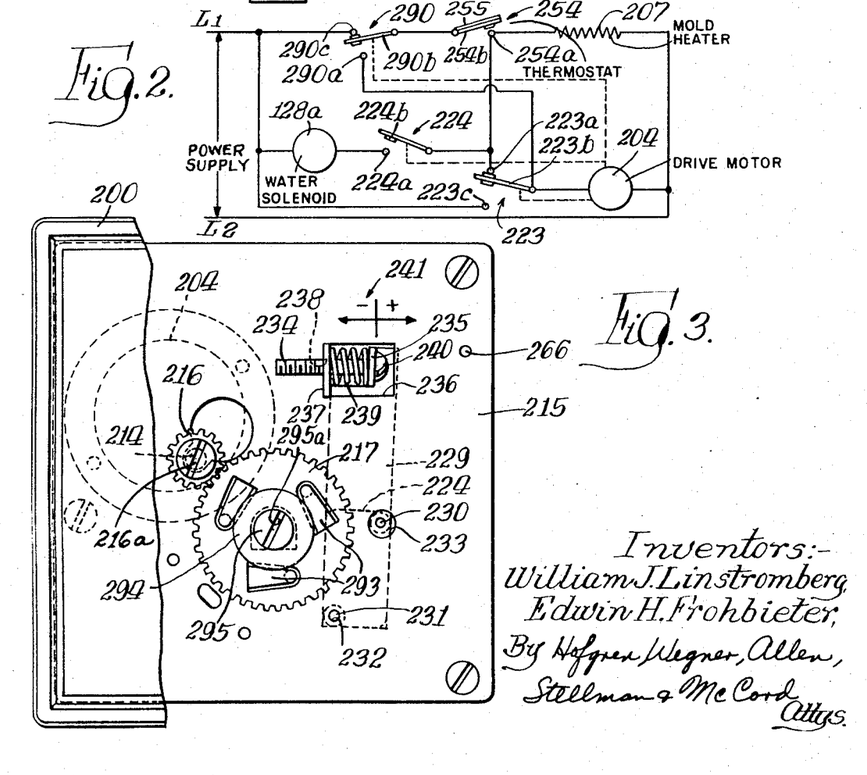
FIGURE 2 is a schematic electrical wiring diagram illustrating the circuitry of the ice maker.
FIGURE 3 is a front view of the control of the ice maker with the cover broken away to illustrate in elevation the elements disposed forwardly of a front mounting plate of the control.

Not only must motor 204 provide the necessary torque for ejecting the ice bodies from the mold cavities, but also must provide accurate timing of the control cycle. For example, the water fill control means of control 130 is arranged to open the water supply valve 128 for a preselected period of time proper for delivering a quantity of water to the mold 126 for accurately filling the cavities 133 to the level L. Undesirable variations in the timing as may result from undesirable variations in the speed of the drive motor may cause the water delivery to vary during successive cycles and thereby cause the ice bodies to vary undesirably in size and in the frangible nature of the connections between the ice bodies and ice body portions. Herein, motor 204 is an hysteresis type synchronous motor which operates at a substantially constant speed at all times. In the illustrated embodiment, motor 204 develops approximately 40 inch ounces of starting torque and 70 inch ounces of stalling torque at rated voltage. The gearing is preferably arranged to operate the ejector at less than approximately one r.p.m. and herein operates the ejector at approximately one-third r.p.m. and with less than approximately 15 inch-pounds of torque, herein the motor and gearing are preselected to operate the ejector with approximately 13 inch-pounds of torque. The use of the hysteresis synchronous motor provides the highly desirable advantages herein of low cost, small size, low weight, accurate repetitive timing, and reduced stalling torque permitting the use of the molded plastic (e.g., acetyl resin, nylon, etc.) ejector and eliminating the need for door switches and the like heretofore required to prevent operation of the ejector when the ice maker was exposed to the user. Further, synchronous motor 204 provides a small coasting which effectively precludes "dead breaking" of the double throw switch 223. More specifically, double throw switch 223 is arranged to energize the motor 204 when in either of its fully thrown positions, as shown in FIGURE 2. During the movement of the moving contact 223b thereof, however, between the fully thrown positions, the motor 204 is effectively de-energized. It is desirable, therefore, that the motor coast sufficiently so as to cause cam surface 222 to effect full throwing of the switch and prevent a condition wherein the moving contact 223b is held somewhere intermediate its fully thrown positions with the motor maintained de-energized.

It is further desirable in control 130 to provide a unidirectional drive which will permit simplified manual reverse movement as during adjustment of the control. As the hysteresis motor 204 provides a unidirectional operation without ratchets and the like necessary to provide unidirectional operation with induction motors, a simplified adjustment and testing is obtained. Further, as the mechanism to provide unidirectional operation is eliminated by means of hysteresis motor 204, a much quieter operation is obtained during the stalled condition as hunting is effectively eliminated. At the same time, the possibility of gear damage is effectively precluded.

WATER FILL CONTROL MEANS

Switch 223 is fixedly secured to the rear of the plate 215 by means of a pair of screws 227 extending through the switch and a spacer block 228 and threaded through the plate 215 (FIGURE 8). Switch 224 is secured to a support bar 229 by a pair of screws 230 and 231. As seen in FIGURE 3, the lower screw 231 extends through a small threaded opening 232 in the plate 215 to pivotally mount the support 229 on the plate 215. The screw 230 extends through a large opening 233 in the plate 215 which permits arcuate movement of screw 230 about the axis of screw 231 and thereby permits switch 224 carried by the support 229 to move arcuately about the axis of screw 232 toward and from the cam 220, as best seen in FIGURE 7. The pivotal disposition of the support 229 is controlled by a screw 234 which extends through a turned tab 235 formed on the upper end of the support 229 and projecting through a rectangular opening 236 in the plate 215 (see FIGURE 3). The plate is provided with an upset tab 237 having a threaded opening 238 through which the screw 234 is threaded. A compression spring 239 is disposed between the tabs 235 and 237 to urge the tab 235 against the head 240 of the screw 234. Thus, by adjusting screw 234, the pivotal position of support 229 may be varied selectively in a clockise or counterclockwise direction, as seen in FIGURE 3, to bring the switch 224 selectively away from and toward the cam 220 (FIGURE 7). A suitable indicia means 241 may be provided on the plate 215 for indicating the sense of control effected by the screw adjustment.

The bodily movement of the switch 224 effects an adjustable positioning of the actuator 226 thereof relative to the camming recess 221, which as best seen in FIGURE 7, includes an inwardly sloped leading cam surface 242 and an outwardly sloped trailing cam surface 243. The actuator 226 is spring biased outwardly against the cam so that by pivoting the switch 224 in a counterclockwise direction from the position shown in FIGURE 7, the switch will be operated with a lesser movement of the actuator along the surface 242 into the recess 221 and will require more times for actuator 226 to be restored to its normal position as the surface 243 moves thereagainst. Alternatively, by repositioning the switch in a clockwise direction from the position of FIGURE 7, the actuator must move further along the surface 242 into the recess 221 before actuation of the switch and will more quickly restore the switch to the normal condition. Thus, a counterclockwise repositioning of the switch causes the switch to be operated for a longer period of time, whereas a clockwise repositioning causes the switch to be actuated for a lesser period of time with the control of the operational time being infinitely adjustable over a preselected range by means of screw 234.

Figure 15:
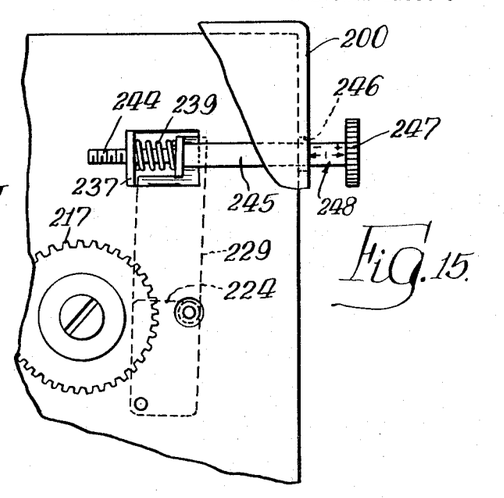
FIGURE 15 is a fragmentary front elevation of a modified form of control embodying the invention having means for adjusting the water delivery disposed externally of the housing, with the cover broken away for facilitated illustration.

Referring now to FIGURE 15, a modified form of means for bodily adjusting the position of switch 224 is shown to comprise a screw 244 having, in lieu of head 235, an elongated shaft 245 which projects outwardly through a suitable opening 246 in the housing 200. At its outer end, the shaft 245 is provided with a knurled knob 247 which is arranged for fingertip manipulation to effect the desired adjustment of screw 244 from externally of the housing. The shaft 245 may be provided with suitable indicia means 248 outwardly of the housing for indicating the sense of adjustment. Thus, the modified form of control as shown in FIGURE 15 is identical to the control provided by screw 234, except that screw 244 having the associated shaft 245 permits an adjustment of the positioning of the switch 224 from externally of the housing.

Figure 16:
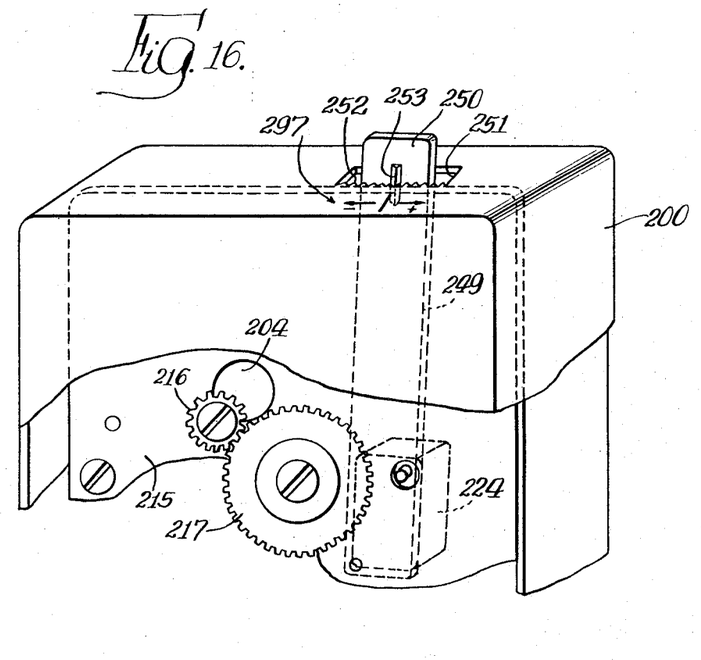
FIGURE 16 is a front elevation of a control having a modified means for adjusting the water delivery from externally of the housing.

In FIGURE 16 still another modified form of means for adjusting the position of switch 224 is shown to comprise a similar control except having a support 249 which is elongated as compared to support 229 and which has a distal end 250 projecting through a slot 251 in the housing 200 so as to be manipulatable from externally of the housing. One edge 252 of the slot is notched to cooperate with a beveled rib 253 on the support end 250 releasably biased thereagainst to hold the support in any one of a plurality of selected pivotal positions.

BIN LEVEL CONTROL MEANS

As further indicated above, the control 130 includes means for sensing the level of ice bodies in the subjacent collecting bin 119. Herein, the sensing means comprises a sensing arm 261. Referring to FIGURES 11 through 14, the sensing arm includes an outer sensing portion 262 which extends downwardly from an external well 263 in the housing 200. At its upper end the portion 262 is provided with a turned portion 264 which passes through an opening 265 in the rear wall 199 of the housing. The distal end 266 of the arm 261 is pivotally received in an opening 267 in the plate 215 and a U-shaped actuating portion generally designated 268 extends between turned portion 264 and distal end 266. The U-shaped portion includes an outer portion 269 extending downwardly from turned portion 264, a bight portion 270 extending transversely from the lower end of the outer portion 269, and an upturned portion 271 extending from the bight portion to distal end portion 266.

A spring 272 is provided for biasing the sensing arm 261 in a clockwise direction, as seen in FIGURE 11, and rearwardly as seen in FIGURE 13. More specifically, the spring 272 includes a coil portion 273 wrapped around the distal end 266 rearwardly of plate 215 and terminating in an elongated end 274 having a turned portion 275 adapted to bear against the right side wall 276 of the housing 200. The opposite end 277 of the spring 272 is provided with a turned first force transfer portion 278 bearing against the right-hand side of the leg 271 (see FIGURE 14) of the U-shaped portion 268 of the sensing arm with the spring being under tension to forcibly bias the leg in a clockwise direction as seen in FIGURE 11. Spring end 277 further includes an intermediate, second force transfer portion 279 extending from the coil portion 273 to bear against the forward edge 280 of the leg 271. The coil portion 273 is under compression to provide a biasing force through portion 279 against leg 271 of the sensing arm to urge the entire sensing arm rearwardly, or to the right as seen in FIGURE 13, to urge leg 269 against the rear wall 199 of housing 200. As shown in FIGURE 13, the rear wall 199 is provided with a forwardly projecting boss 281 which lies in the path of movement of rear leg 269 as it moves along the wall 199. The boss 281 is preferably provided with an inclined, camming side surface which as shown in FIGURE 13 is defined by a rounded profile for camming the U-shaped actuating portion 268 away from the wall 199 when the leg 269 is moved against the boss.

The bight 270 of the U-shaped portion 268 is movably received in a slot 282 of a crank 283 which includes a cam follower 284 (FIGURE 11) engaging a rearward cam section 285 of the cam portion 220 of shaft 203. The crank is pivotally mounted on a boss 286 projecting forwardly from a rear wall 199 of the housing 200 by means of a pivot screw 287. As shown in FIGURE 11, pivoting of the crank 283 about the pivot 287 is effected by the rotation of cam section 285 as follower 284 is urged thereagainst by the spring 272.

The crank 283 is provided with a tab 288 which engages an actuator 289 of a shut-off switch 290 secured to the rear wall 199 by a pair of screws 291. The pivotal movement of the crank 283 thusly operates the switch 290 and concurrently acts through the actuating portion 268 of the sensing arm 261 to move the outer sensing portion 262 of the sensing arm between a lowermost position shown in dotted lines in FIGURE 12 to an uppermost position shown in full lines therein. Further, the user may move the sensing arm portion 262 to an upper shut-off position as shown in broken lines in FIGURE 11, which, as illustrated in FIGURE 14, moves the leg portion 268 of the sensing arm in a counterclockwise direction beyond the boss 281. As indicated above, the portion 277 of the coil spring 272 forces the leg 269 of the U-shaped actuating portion against the wall 199 with a second force which is transverse to the force generated by the spring 272 through the portion 278 bearing against the leg 271 of the actuating portion. The relative magnitudes of these transverse forces is coordinated with the slope of the boss 281 providing the camming of leg 269 away from wall 199 so as to assure the retention of the leg 269 behind the boss against the force developed between spring end 278 and leg 271 tending to move the leg 269 back past the boss 281. Thus, the leg 269 is effectively retained by the boss 281 with the sensing arm in the upper position of FIGURE 14 wherein the tab 288 is spaced from the actuator 289 to thereby preclude further operation of the ice maker. The resilient resistance of the spring 272 may be readily overcome, however, when it is desired to return the sensing arm to the lower positions of FIGURE 11, by intentional manipulation by the user. Thus, to return the sensing arm 261 to the operating position, the user merely moves the control arm against the compressional bias of spring 272 past the boss 281 in a clockwise direction, whereupon normal operation of the sensing arm with portion 278 biasing the actuating portion 268 in a clockwise direction as shown in FIGURE 11 may again occur.

MANUAL START MEANS

At certain times, such as in the testing of the ice maker 118 during manufacture thereof, it is desirable to effect movement of the cam portion 220 to initiate an ejection cycle in the absence of the formation of any ice bodies in the mold cavities. To this end, the cam 220 is provided with an additional camming surface 292 which as shown in FIGURE 8 faces axially of the shaft 203. Operation of switch 223 by the engagement of cam surface 292 with the actuator 225 thereof is effected by manual movement of the entire shaft 203 axially rearwardly, or to the right as seen in FIGURE 8. As best seen in FIGURE 3, gear 217 is provided with a plurality of integrally molded spring fingers 293. The shaft is biased forwardly or to the left as seen in FIGURE 8 by the spring fingers which bear against the plate 215 and urge the gear 217 axially forwardly, or to the left as seen in FIGURE 8, against a washer 294 held against the gear by a suitable screw 295 extending through the washer and gear into the shaft cam portion 220 and provided with a head slot 295a. The cam portion 220 is provided with a plurality of forwardly projecting lugs 296 which bear against the cover plate to have low friction movement thereagainst and locate the cam 220 as shown in FIGURE 8. The forward end 218 of the shaft 203 is axially slidably received in the opening 219 in plate 215 and the shaft portion 203 in bearing 198 is axially movable therein to permit limited axial rearward movement of the shaft and cam, to the right as seen in FIGURE 8, and thereby cause the cam surface 292 to engage the actuator 225 to operate switch 223. Such rearward movement of the shaft and cam to operate switch 223 is easily effected by a manual pushing force applied against the face of gear 217. Release of the manually applied force to the gear after motor 204 has been energized sufficiently to rotate cam 220 to maintain switch 223 closed permits the stressed spring fingers 293 as illustrated in FIGURE 10 to restore the shaft 203 to the full line, retracted position of FIGURE 8, while the switch 223 is maintained in circuit energizing disposition. Thus, the cam 220 includes a first camming means 222 which cooperates with actuator 225 of switch 223 to operate the switch and thereby energize the drive motor 204 upon a preselected amount of rotation of the cam 220 from the reset position wherein the cam stops at the end of each ejection cycle. In addition, the cam 220 includes a second cam means 292 which energizes the motor 204 upon a preselected axial movement of the cam 220 from the preselected retracted position shown in full lines in FIGURE 8.

Alternatively, the drive may be rotated manually to cause the cam surface 222 to operate actuator 225 to energize motor 204. The manual rotation may be effected by means of a suitable tool, such as a screwdriver or the like, in engagement with a slot 216a of the screw drive gear 216 to rotate the cam 222 sufficiently to operate the switch 223. As shown in FIGURE 3, the drive gear 216 comprises a gear in the series thereof between drive motor 204 and shaft 203 which is a gear other than the gear directly associated with the shaft, herein gear 217. Thus, a mechanical advantage is provided by the gearing itself in manually adjusting the disposition of cam surface 222.

OPERATION OF THE ICE MAKER

Operation of ice maker 118 may best be understood with reference to the schematic wiring diagram of FIGURE 2. As shown therein, switch 224 is provided with a moving contact 224b and a fixed contact 224a. The fixed contact 224a is connected to the solenoid 128a of solenoid valve 128 which in turn is connected to one side $L_1$ of the power supply, which may comprise the conventional single phase, 120-volt alternating house current power supply. The moving contact 224b is connected to a first fixed contact 223a of switch 223 and to a fixed contact 254a of thermostat switch 254. The switch 223 as indicated above further includes a moving contact 223b which is connected to the motor 204 which in turn is connected to the other side $L_2$ of the power supply and to one end of the mold heater 207, the other end of the mold heater being connected to contact 254a of thermostat 254. Moving contact 223b of switch 223 is further connected to a fixed contact 290a of switch 290. The thermostat 254 includes a moving contact 254b which is connected to a moving contact 290b of switch 290. Switch 290 further includes a second fixed contact 290c which is connected to side $L_1$ of the power supply. Switch 223 further includes a second fixed contact 223c which is also connected to side $L_1$ of the power supply.

Assuming that mold 126 contains a quantity of water previously delivered thereto from the water supply and which is in the process of being frozen in the cavities 133 to form the ice bodies II, and the level of the ice bodies in collecting bin 119 is below the preselected level, the functioning of ice maker 118 is as follows. Mold thermostat 254 senses the relatively warm temperature of the mold indicating the incomplete freezing of the ice bodies. Thus, contact 254b of thermostat 254 is spaced from contact 254a breaking the circuit from power supply side $L_1$ to control motor 204. Further, switch 290 is in the position shown in FIGURE 2 with its moving contact 290b engaging fixed contact 290c, and switch 223 is in the position shown in FIGURE 2 with its moving contact 223b engaging its fixed contact 223a. The switch 224 is in the open position having its moving contact 224b spaced from fixed contact 224a, thereby de-energizing the solenoid 128a. Thus, as shown in FIGURE 2, the control is in a de-energized condition wherein none of the motor 204, heater 207, or solenoid 128a is energized.

As discussed above, when the temperature sensed by thermostat 254 drops a small amount below freezing, such as to approximately 23° F., the thermostat contact 254b moves into engagement with fixed contact 254a thus establishing a circuit from power supply side $L_1$ through switch 290 and switch 223 to the motor 204. At the same time, the heater 207 is energized by the closing of thermostat switch 254. In the shut-off position, the fingers 188 of the ejector 131 are in the position of FIGURE 6. Energization of motor 204 causes a rotation of shaft 189 to bring the fingers around in a clockwise direction, as seen in FIGURE 6, to engage the right-hand upper surface of the ice bodies in the cavities 133. During this rotation, the mold is being heated by the heater 207 to free the ice bodies from the mold. During the initial portion of this rotation, cam 220 firstly actuates switch 223 to throw the moving contact 223b from fixed contact 223a into engagement with fixed contact 223c, thereby providing a holding circuit from power supply side $L_1$ directly to the motor 204 and thereby maintaining the motor energized irrespective of the condition of thermostat switch 254 during the remainder of the ejection cycle. A small additional amount of rotation of motor 204 causes cam section 285 to pivot crank 283 in a clockwise direction, as seen in FIGURE 11, and thereby raise the sensing arm portion 262 upwardly from the collecting bin 119. Concurrently, the movement of tab 288 away from actuator 289 causes moving contact 290b of switch 290 to move from fixed contact 290c and into engagement with fixed contact 290a. Thus, heater 207 is energized through switches 223 and 290 in series with thermostat switch 254 so as to maintain the heater under the control of the thermostat switch while allowing the motor 204 to be independent thereof.

In the event that the ice bodies have not been sufficiently freed from the mold walls through energization of heater 207 such as to permit the ejector fingers 188 to force the ice bodies outwardly from the cavities when the fingers engage the ice bodies, the motor 204 stalls. When the heater sufficiently frees the ice bodies from the mold walls to permit the ejector fingers to force the ice bodies outwardly therefrom, rotation of motor 204 recommences. As the fingers sweep through the cavities in a clockwise direction, as seen in FIGURE 6, the sensing arm portion 262 moves downwardly into the collecting bin 119. Assuming that the level of ice bodies therein is below the preselected upper level, the arm moves unimpededly to its lowermost position. In this position, tab 288 acts against actuator 289 to dispose switch 290 with moving cotnact 290b in engagement with fixed contact 290c.

After approximately 330 degrees of rotation, recess 221 of cam portion 220 moves into alignment with actuator 226 of switch 224 (FIGURE 7), thereby permitting the bias of switch 224 to close moving contact 224b with fixed contact 224a. However, as contact 254a is connected to power supply side $L_1$ through switches 254 and 290, the solenoid 128a is shunted out and no energization of the solenoid is effected at this time.

Motor 204 continues to rotate, driving the ejector fingers upwardly from the mold cavities 133 and bringing the ice bodies outwardly from the cavities onto the stripper fingers 209 in an inverted position thereon. The cam 220 now moves moving contact 223b of switch 223 from contact 223c into engagement with contact 223a. The motor is now energized from power supply side $L_1$ through switches 290, 254 and 223 and, thus, continues to rotate. The continued movement of the fingers 188 of the ejector 131 causes the ice bodies to move downwardly over the upper surface 213 of the stripper fingers into the collecting bin 119. As discussed above, the ice bodies are positively stripped from the fingers by the improved construction of the ejector fingers, providing the ice bodies II for delivery to the collecting bin in the bifurcated form shown in FIGURE 15.

After the ice bodies are stripped and conducted away from the mold to the collecting bin, the ejector fingers continue to move in a clockwise direction as shown in FIGURE 6 to once again sweep through the cavities 133. During this second movement of the fingers through the cavities, the cam 220 repositions the moving contact 223b of switch 223 in engagement with fixed contact 223c, thereby re-establishing the holding circuit to motor 204. By utilizing the second rotational cycle of the ice maker, a sufficient time delay is obtained to permit the thermostat 254 to reset notwithstanding the relatively high reset temperature requirement thereof. The resetting of the thermostat is facilitated by the now complete removal of ice bodies from the mold permitting the heat energy from electrical heater 207 to raise the temperature of the rear mold wall 174 as sensed by thermostat 254 to the reset temperature, herein approximately 50° F.

As the motor 204 recycles cam 220, switch 290 is again operated by the cam to throw its moving contact 290b from contact 290c into engagement with contact 290a. As indicated above, at this time, sufficient heat from the heater 207 will have been delivered to the mold wall 174 to cause the temperature sensed by thermostat sensor 255 to cause moving contact 254b to become spaced from fixed contact 254a. This transfer of the thermostat switch may be effected, for example, at a temperature of approximately 50° F. ± 5° F. Thus, mold heater 207 is de-energized at this time. Continued operation of motor 204 by means of the holding circuit through switch 223 causes the cam 220 to rotate once again to the position wherein moving contact 224b of switch 224 closes with fixed contact 224a thereof. At this time, however, thermostat switch 254 is open and, thus, the solenoid 128a is not shunted out when switch 224 closes but rather is energized through switch 224 and mold heater 207 to open valve 128 and deliver water from the water supply through the inlet 127 into the mold as discussed above.

Further, as discussed above, the adjustment of the position of switch 224 by means of the adjustment of support 229 permits an accurate control of the time during which the switch 224 is closed. As indicated briefly above, if the quantity of water delivered to the mold during the originally set time controlled by the adjustment of screw 234 is too short to provide the necessary quantity of water to the mold cavities, suitable adjustment of the screw may be effected to adjust the position of switch 224 to permit the closing of the switch 224 for a longer period of time. Reversely, if the quantity of water is too great, adjustment of screw 234 may be effected in a reverse direction to shorten the water delivery time. The indicia means 241, as shown in FIGURE 3, 248 as shown in FIGURE 15, and 297 as shown in FIGURE 16, indicate the direction of adjustment necessary to increase or decrease the quantity of water.

The continued rotation of motor 204 and, thus, of cam 220 subsequent to the reopening of switch 224 causes moving contact 223b of switch 223 to move from contact 223c to contact 223a, thereby breaking the holding circuit to motor 204 and de-energizing the control 130 until the next quantity of ice bodies are formed in the cavities 133 to initiate another cycle as described above.

When the level of ice bodies in the collecting bin 119 is sufficient to preclude the free movement of the sensing arm portion 262 downwardly into the collecting bin to the lower position shown in dotted lines in FIGURE 12, the operation of control 130 is interrupted because tab 288 does not permit contact 290b of switch 290 to move from fixed contact 290a. Thus, the portion of the cycle wherein motor 204 is energized through switches 290 and 254 cannot be effected, and the ice maker remains inoperative until such time as the level of ice bodies in the collecting bin is lowered sufficiently to permit the sensing arm to drop due to biasing action of spring 272 and thereby operate actuator 289 to again throw moving contact 290b into engaegment with fixed contact 290c.

It should be noted that the interruption of the operation of the ice maker by the blocking of sensing arm 261 may be effected during either of the two 360 degree movements of the ejector fingers 188 through the cavities 133. Thus, when a fresh group of ice bodies is delivered to the collecting bin and raises the level thereof above the preselected level, this condition is sensed during the immediately following second 360 degree rotation of the ejector whereupon the ice maker is de-energized and prevented from recycling after the holding switch 223 opens.

Ice maker 118 is extremely simple and economical of construction while providing long trouble-free life. It is of minimum size and weight for facilitated installation in freezers and the like where minimum size is a desideratum. The positive stripping of the ice bodies from the ejector and the provision of the ice bodies in bifurcated form for facilitated selective use as single or double size ice bodies provides a highly desirable feature.

While we have shown and described certain embodiments of our invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. Ice maker apparatus comprising:
   means defining a mold cavity;
   means for conducting water to said cavity to be frozen therein to form an ice body; and
   means for regulating the delivery of water to said cavity through said conducting means including valve means for controlling flow through said conducting means, and control means for operating said valve means, said control means including switch means having a cam-actuatable operating portion, means operatively connecting said switch means to said valve means, cam means movably engaging said operating portion for arranging said switch to cause said valve means to be open for a selected period of time variable as a function of the position of said operating portion relative to said cam means, and means for manually bodily adjustably positioning said control means to adjust the position of said operating portion relative to said cam means for varying the quantity of water delivered to said cavity by adjusting said period of time said valve means is caused to be open.

2. The ice maker apparatus of claim 1 wherein said adjusting means comprises means infinitely adjustable over a preselected range.

3. The ice maker apparatus of claim 1 wherein said adjusting means is adjustable in opposite directions to selectively lengthen and shorten said period of time.

4. The ice maker apparatus of claim 1 wherein said positioning means comprises a support, means for pivotally mounting the support, means mounting said switch means on said support to dispose said operating portion thereof adjacent said cam means, and means for adjusting the pivotal disposition of said support for adjusting the position of said operating portion relative to the cam means.

5. The ice maker apparatus of claim 4 wherein said adjusting means comprises a threaded member fixedly positioned adjacent said support, and threaded means carried by said support for threaded engagement with said member.

6. Ice maker apparatus comprising:
   means defining a mold cavity;
   means for conducting water to said cavity to be frozen therein to form an ice body; and
   means for regulating the delivery of water to said cavity through said conducting means including valve means for controlling flow through said conducting means and having a solenoid operator, a housing, control means in said housing for operating said valve means, said control means including a switch means having a cam-actuatable operating portion, means operatively connecting said switch means to said valve means, cam means movably engaging said operating portion for arranging said switch means to operate said solenoid operator to cause said valve means to be open for a selected period of time, and means for bodily adjustably positioning said control means to adjust the position of said switch relative to said cam means for varying the quantity of water delivered to said cavity by adjusting said period of time said valve means is caused to be open, said positioning means including a support, means for pivotally mounting the support, means mounting said switch means on said support to dispose said operating portion thereof adjacent said cam means, and means for adjusting the pivotal disposition of said support for adjusting the position of the operating portion of the control means relative to the cam means, said adjusting means including an operating member projecting outwardly through said housing for permitting adjustment of the positioning of the control means from outwardly of the housing.

7. The ice maker apparatus of claim 6 wherein said adjusting means comprises a threaded member having a finger-manipulating portion disposed outwardly of the housing.

8. The ice maker apparatus of claim 6 wherein said adjusting means comprises cooperating ratchet and lug means on said housing and support for retaining said support substantially in any one of a plurality of different pivotal positions.

9. The ice maker apparatus of claim 6 wherein said adjusting means includes a distal portion of said support extending outwardly through said housing and cooperating means on said housing and support for releasably locking the support in any one of a plurality of different pivotal positions.

10. The ice maker apparatus of claim 6 wherein said control means further includes drive means providing an accurately constant speed of operation of said cam means.

11. In an ice maker apparatus having means defining a refrigerated chamber, means defining a mold cavity in said chamber, and means for delivering water to said cavity for forming an ice body therein, control means in said chamber for causing cyclical operation of the apparatus to form seriatim a plurality of ice bodies in said cavity including means for controlling the quantity of water delivered to said cavity by said delivery means, a housing substantially enclosing said control means, and mechanical means for adjusting the water delivery controlling means from exteriorly of the housing for varying varying the quantity of water delivered to the mold cavity during each cycle.

12. The ice make rapparatus of claim 11 wherein said water delivery controlling means includes switch means within said housing and a manual operating means exteriorly of the housing and means extending through said housing between said operating means and said switch means for adjusting the position of the switch means in said housing for varying the quantity of water delivered.

13. The ice maker apparatus of claim 12 further including means associated with said operating means for indicating the sense of adjustment of the control effected by selective operation of the operating means.

14. The ice maker apparatus of claim 11 wherein said means for delivering water delivers the water at a substantially constant flow rate and said water delivery controlling means includes means for varying the time of delivery to thereby vary the quantity of water delivered.

15. The ice maker apparatus of claim 11 further including means for initiating a cycle of operation of said control means comprising:
   a gear forming a portion of said control means;
   means rotatably and axially movably carrying said gear for rotation seriatim to a reset position;
   means movable with said gear and provided with first and second cam means;
   means responsive to a preselected condition for causing rotation of said gear from said reset position to start position; and
   a switch responsive selectively to said first cam means for energizing said control means upon rotation of the gear from said reset position to said start position thereby to initiate a cycle of operation of the control means and responsive to movement of said second cam means for energizing said control means upon a preselected axial movement of said gear from said reset position whereby said cycle of operation may be initiated irrespective of the non-existence of said preselected condition.

16. The apparaus of claim 15 wherein means are provided for biasing said gear axially to said reset position.

17. The apparatus of claim 15 including a wall means disposed adjacent said gear and means are provided extending resiliently between said gear and said wall means for biasing said gear axially to said reset position.

18. The apparatus of claim 15 wherein said biasing means are formed integrally with said gear.

References Cited by the Examiner

UNITED STATES PATENTS

| | | | |
|---|---|---|---|
| 2,923,134 | 2/1960 | Bauerlein et al. | 62—353 X |
| 2,969,654 | 1/1961 | Harle | 62—353 X |
| 3,048,986 | 8/1962 | Archer | 62—353 X |
| 3,089,312 | 5/1963 | Harle | 62—344 X |

ROBERT A. O'LEARY, *Primary Examiner.*

MEYER PERLIN, *Examiner.*

W. E. WAYNER, *Assistant Examiner*